US009280307B2

(12) United States Patent
Nasu (10) Patent No.: US 9,280,307 B2
(45) Date of Patent: Mar. 8, 2016

(54) INFORMATION PROCESSING SYSTEM, APPARATUS, AND METHOD

(71) Applicant: Masami Nasu, Kanagawa (JP)

(72) Inventor: Masami Nasu, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/571,494

(22) Filed: Dec. 16, 2014

(65) Prior Publication Data

US 2015/0178025 A1 Jun. 25, 2015

(30) Foreign Application Priority Data

Dec. 24, 2013 (JP) .................................. 2013-265730

(51) Int. Cl.
*G06F 3/12* (2006.01)

(52) U.S. Cl.
CPC ............ *G06F 3/1236* (2013.01); *G06F 3/1203* (2013.01)

(58) Field of Classification Search
CPC ... G06F 3/1203; G06F 3/1236; G06F 3/1247; G06F 3/1271; G06F 3/1288; H04N 1/00204; H04N 1/0023; H04N 1/00233; H04N 1/00244; H04N 1/00464; H04N 2201/001; H04N 2201/0094
USPC ....................................................... 358/1.15
See application file for complete search history.

(56) References Cited

U.S. PATENT DOCUMENTS

| 6,209,048 B1 | 3/2001 | Wolff |
| 8,209,414 B2 | 6/2012 | Sagefalk et al. |
| 8,717,601 B2 * | 5/2014 | Yabe et al. .................. 358/1.15 |
| 2014/0146364 A1 * | 5/2014 | Matsumoto ................. 358/1.15 |

FOREIGN PATENT DOCUMENTS

| JP | H09-325925 | 12/1997 |
| JP | 2009-260966 | 11/2009 |
| JP | 2011-232893 | 11/2011 |

* cited by examiner

*Primary Examiner* — Iriana Cruz
(74) *Attorney, Agent, or Firm* — IPUSA, PLLC (57) ABSTRACT

An information processing system includes first and second information processing apparatuses. The first information processing apparatus transmits a request for status notification to the second information processing apparatus, which transmits a response of the status notification to the first information processing apparatus. The second information processing apparatus transmits a header of the response to the first information processing apparatus when receiving the request for the status notification from the first information processing apparatus, and transmits a part of a body of the response to the first information processing apparatus in response to the occurrence of a status change to be reported in the second information apparatus. The part of the body includes information on the status change. The second information processing apparatus transmits a last part of the body of the response to the first information processing apparatus when the status notification becomes unnecessary.

11 Claims, 10 Drawing Sheets

FIG.11

INFORMATION PROCESSING SYSTEM, APPARATUS, AND METHOD

CROSS-REFERENCE TO RELATED APPLICATION

The present application is based upon and claims the benefit of priority of Japanese Patent Application No. 2013-265730, filed on Dec. 24, 2013, the entire contents of which are incorporated herein by reference.

BACKGROUND OF THE INVENTION

1. Field of the Invention

The present invention relates to information processing control techniques.

2. Description of the Related Art

Web application program interfaces (Web APIs) of a style called SOAP (Simple Object Access Protocol) or REST (Representational State Transfer) are often used for providing various services on the Web (Web services). Web APIs are based on communications by HTTP (Hypertext Transfer Protocol). Service providers operate as HTTP servers to provide Web APIs, while service users operate as HTTP clients to use the Web APIs.

On the other hand, examples of information processing systems or information processing apparatuses include image forming apparatuses such as laser printer (LP)s and multifunction peripheral (or multifunction printer) (MFP)s. According to these types of image forming apparatuses, an operation part that displays a screen and performs key input operations is provided independent of a body part (a controller and an engine) so as to avoid a decrease in operational response even when the operational load on the body part is high. The operation part is provided with an independent operating system (OS) such as Android (registered trademark), and operates independent of the body part.

In image forming apparatuses also provided with such an operation part, the above-described REST-style Web APIs may be used, and an application (application program) on the operation part implements functions using a Web API provided by the body part.

Common HTTP communications are based on a configuration where a server returns a response to a request from a client. Therefore, according to the architecture of HTTP communications, it is impossible in principle to notify a client of changes in status (events) that occur at random times on the server side.

A number of techniques for notifying changes in status that occur on the server side have been discussed. As a typical technique, a technique called polling, according to which a client queries a server at regular intervals to check changes in the status of the server, is commonly known.

Furthermore, techniques such as Ajax (Asynchronous JavaScript [registered trademark]+XML [Extensible Markup Language]), LongPolling, and Comet are commonly known as measures for emulating notifying a client of changes in the status of a server.

SUMMARY OF THE INVENTION

According to an aspect of the present invention, an information processing system using a protocol according to which a session with respect to a single request is completed by returning a predetermined response to the single request includes a first information processing apparatus and a second information processing apparatus. The first information processing apparatus transmits a request for status notification to the second information processing apparatus, and the second information processing apparatus transmits a response of the status notification to the first information processing apparatus. The second information processing apparatus includes a processor and a memory storing instructions that, when executed by the processor, causes the second information processing apparatus to transmit a header of the response of the status notification to the first information processing apparatus in response to receiving the request for the status notification from the first information processing apparatus, transmit a part of a body of the response of the status notification to the first information processing apparatus in response to occurrence of a status change to be reported in the second information apparatus, the part of the body including information on the status change, and transmit a last part of the body of the response of the status notification to the first information processing apparatus in response to the status notification becoming unnecessary.

According to an aspect of the present invention, an information processing apparatus of an information processing system using a protocol according to which a session with respect to a single request is completed by returning a predetermined response to the single request, wherein another information processing apparatus transmits a response of the status notification to the information processing apparatus, includes a processor and a memory storing instructions that, when executed by the processor, causes the information processing apparatus to transmit a request for status notification to the other information processing apparatus of the information processing system, receive a header of the response of the status notification transmitted from the other information processing apparatus in response to the request for the status notification, receive a part of a body of the response of the status notification transmitted from the other information processing apparatus in response to occurrence of a status change to be reported in the other information processing apparatus, the part of the body including information on the status change, and receive a last part of the body of the response of the status notification transmitted from the other information processing apparatus in response to the status notification becoming unnecessary.

According to an aspect of the present invention, an information processing method executed by an information processing apparatus of an information processing system using a protocol according to which a session with respect to a single request is completed by returning a predetermined response to the single request, wherein another information processing apparatus transmits a response of the status notification to the information processing apparatus, includes transmitting a request for status notification to the other information processing apparatus of the information processing system, receiving a header of the response of the status notification transmitted from the other information processing apparatus in response to the request for the status notification, receiving a part of a body of the response of the status notification transmitted from the other information processing apparatus in response to occurrence of a status change to be reported in the other information processing apparatus, the part of the body including information on the status change, and receiving a last part of the body of the response of the status notification transmitted from the other information processing apparatus in response to the status notification becoming unnecessary The object and advantages of the invention will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

As described above, a number of techniques for reporting changes in a server status from an HTTP server to an HTTP client have been devised. The techniques, however, have respective problems and restrictions as follows.

Polling refers to detecting changes in the status of a server by periodically querying the server about its status by a client. Accordingly, the timing (realtimeness) of detection of changes in the server status depends on the client process.

For example, a client periodically polls a server (transmits a status notification request to and receives a response from a server) at times t1, t2, t3, and so on. In this case, if the status of the server changes between time t1 and time t2, there is a delay before the status change is detected by polling at time t2, thus lacking in realtimeness.

Ajax is a technique for performing asynchronous communications between a Web browser and a server. Here, the term "asynchronous" means the absence of synchronism with the updating of a browser screen. Communications between a Web browser and a server used to be possible only in synchronism with the updating a browser screen. Therefore, Ajax has been developed as a technique for communicating asynchronously with a browser screen.

Ajax, however, does not differ greatly from polling in that a server status can only be returned at the time of a client's request in client-server communications.

Comet and LongPolling are techniques according to which a server returns no response before the occurrence of a change in the server status when polled by a client. It is possible for the server to respond in real time in accordance with changes in the server status by maintaining the connection with the client. (See, for example, Japanese Laid-Open Patent Application No. 2011-232893.)

According to these techniques, however, the client and the server are disconnected once the server responds to the client. Therefore, when it is required to continue to detect changes in the server status, the client is required to poll the server again. Therefore, if the server status changes in an extremely short period of time, the change may not be detected.

For example, when a client polls a server at time t1, the server waits until a status change occurs. When a status change occurs at time t2, the server notifies the client of the status change. The communication, however, ends by this notification of the status change (response). Therefore, if another status change subsequently occurs in the server immediately after the end of the communication, it is not possible for the client to detect the subsequent status change by polling the server again at time t3.

According to an aspect of the present invention, it is ensured that changes in the status of an information processing apparatus operating as a server are reported in real time to an information processing apparatus operating as a client.

A description is given below, with reference to the accompanying drawings, of one or more embodiments of the present invention. In the following, a description is given, taking an image forming apparatus as an example of an information processing system or apparatus. Embodiments of the present invention, however, may also be applied to information processing systems or apparatuses other than the image forming apparatus.

Figure 1:
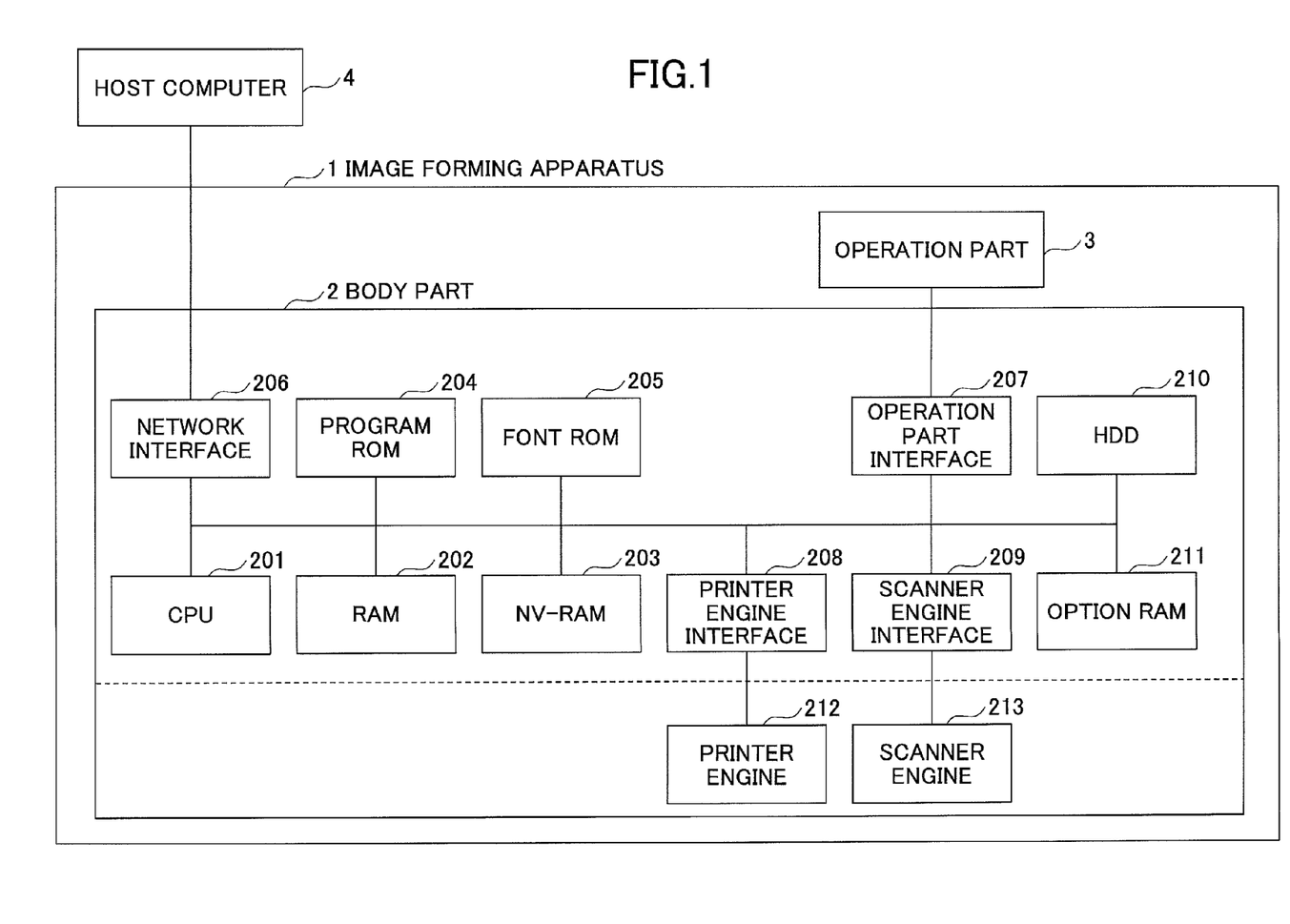
FIG. 1 is a diagram illustrating a hardware configuration of an image forming apparatus according to an embodiment of the present invention.

FIG. 1 is a diagram illustrating a hardware configuration of an image forming apparatus according to an embodiment of the present invention.

Referring to FIG. 1, an image forming apparatus 1 such as an MFP includes a body part (controller and engines) 2 and an operation part 3. The operation part 3 has a wired or wireless connection to the body part 2.

The body part 2 has the function of converting print data from a host computer 4 (such as a personal computer [PC] or a server) into video data and outputting the video data to a printer engine 212 in accordance with a control mode set at the time and a control code from the host computer 4. Furthermore, the body part 2 has the function of reading an original image by a scanner engine 213, and making a copy of the read image by outputting the read image to the printer engine 212, or outputting the read image to the host computer 4.

The operation part 3 is a computer unit that includes a touchscreen and its own OS along with a central processing unit (CPU) and a memory.

The body part 2 includes a CPU 201, a random access memory (RAM) 202, a nonvolatile RAM (NV-RAM) 203, a program read-only memory (ROM) 204, a font ROM 205, a network interface 206, an operation part interface 207, a printer engine interface 208, a scanner engine interface 209, a hard disk drive (HDD) 210, an option RAM 211, the printer engine 212, and the scanner engine 213.

The CPU 201 processes data (print data and control data) from the host computer 4.

The RAM 202 is used as a work memory when the CPU 201 executes processes. The RAM 202 is also used as a buffer for managing and temporarily storing data from the host computer 4 page by page and as a bitmap memory for storing video data (actual print patterns) into which data stored in the buffer are converted.

The NV-RAM 203 is a nonvolatile RAM for storing data that are desired to be retained even after power is turned off.

The program ROM 204 contains programs for managing data inside the body part 2 and controlling peripheral modules.

The font ROM 205 contains various kinds of font data used for printing.

The network interface 206 is an interface for control signals and data from the host computer 4 to the image forming apparatus 1 and status signals data from the image forming apparatus 1 to the host computer 4.

The operation part interface 207 is an interface for control signals and data between the body part 2 and the operation part 3.

The printer engine interface 208 is an interface for control signals and data to the printer engine 212 and status signals from the printer engine 212.

The scanner engine interface 209 is an interface for control signals to the scanner engine 213 and status signals and data from the scanner engine 213.

The HDD 210 is a large-capacity storage device.

The option RAM 211 is a RAM that is additionally installed.

The printer engine 212 forms and develops an electrostatic latent image on a photoconductor based on a video signal and a control signal provided via the printer engine interface 208, feeds transfer paper from a paper feeding part, and forms an image on the transfer paper by transferring and fixing the developed image onto the transfer paper.

The scanner engine 213 optically reads original material such as a document and outputs image information.

Figure 2:
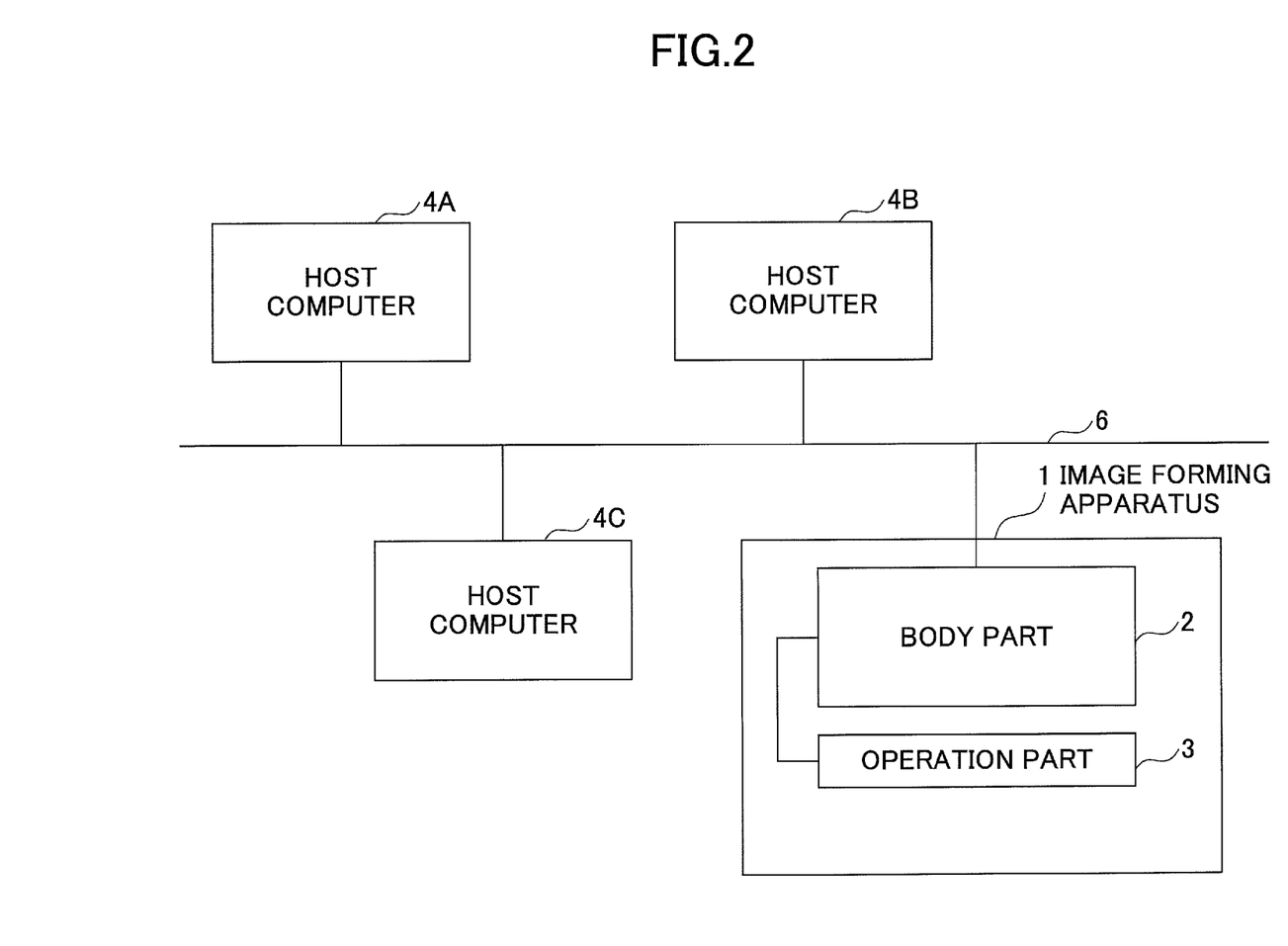
FIG. 2 is a diagram illustrating a network configuration.

FIG. 2 is a diagram illustrating a network configuration according to the embodiment of the present invention.

Referring to FIG. 2, multiple host computers 4A, 4B and 4C and the image forming apparatus 1 are interconnected by a communication medium 6.

The image forming apparatus 1 includes the body part 2 and the operation part 3. The operation part 3 is in direct wired or wireless connection to the body part 2. Alternatively, the operation part 3 may be connected to the body part 2 via an access point (not illustrated) on the network. An application on the operation part 3 implements functions of the application using a Web API provided by the body part 2.

It is possible for the host computers 4A, 4B and 4C, which may be hereinafter collectively referred to as the "host computer 4," to make a request for printing to the image forming apparatus 1 and receive read images of original material from the image forming apparatus 1, and to use Web services using Web APIs provided by the image forming apparatus 1 (the body part 2).

Figure 3:
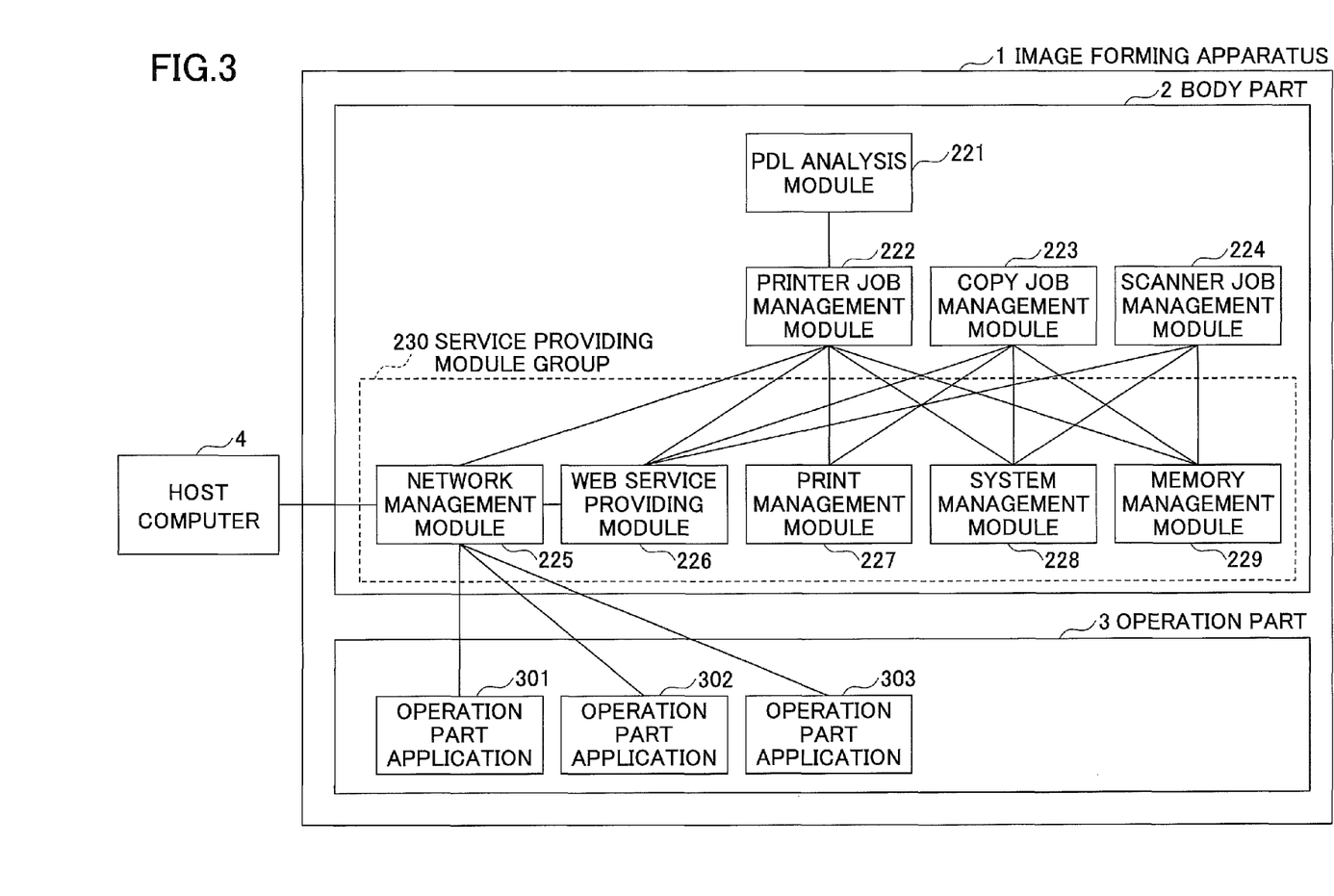
FIG. 3 is a diagram illustrating a software configuration of the image forming apparatus.

FIG. 3 is a diagram illustrating a software configuration of the image forming apparatus 1. By way of example, a description is given of the case where an application on the operation part 3 is a client that uses a Web service provided by the body part 2. The client, however, is not limited to an application on the operation part 3, and may be an application (PC application or server application) on the host computer 4.

Referring to FIG. 3, the body part 2 includes a network management module 225, a Web service providing module 226, a print management module 227, a system management module 228, and a memory management module 229, which form a service providing module group 230. Furthermore, the body part 2 includes a printer job management module 222, a copy job management module 223, and a scanner job management module 224, which use the functions of the modules 225 through 229 of the service providing module group 230. Furthermore, the body part 2 includes a PDL analysis module 221 used by the printer job management module 222.

The operation part 3 includes operation part applications 301, 302 and 303. The operation part applications 301 through 303 operate on the operation part 3. Applications having various functions may be developed using JAVA (registered trademark), the Android (registered trademark) SDK, or APIs independently provided by the body part 2. The number of operation part applications is not limited to three as illustrated in. FIG. 3, and may be one, two, or four or more. Here, it is assumed that the operation part applications 301 through 303 operate as clients of Web services.

The PDL analysis module 221 of the body part 2 is a module that analyzes PDL data that the image forming apparatus 1 receives from the host computer 4 and generates a print image. The PDL analysis module 221 receives PDL data from the printer job management module 222, and generates a print image on memory reserved from the memory management module 229 through the intermediation of the printer job management module 222. Furthermore, the PDL analysis module 221 obtains apparatus configuration information, for example, information such as the configuration of paper feeding trays and paper ejection trays and the sizes of paper in paper feeding trays, which is used at the time of generation of print images, from the system management module 228 through the intermediation of the printer job management module 222.

The printer job management module 222 performs general control of PDL processing. The printer job management module 222 is a module that mediates processes required by the PDL analysis module 221 and makes requests to other modules. For example, the printer job management module 222 mediates the transfer of PDL data received by the network management module 225 to the PDL analysis module 221, mediates the acquisition of apparatus information managed by the system management module 228 by the PDL analysis module 221, mediates the reservation of required memory from the memory management module 229 by the PDL analysis module 221, and issues print requests to the print management module 227 with respect to print images created by the PDL analysis module 221.

The copy job management module 223 performs general control of copy processing. The copy job management module 223 implements a copy function using the service providing module group 230.

The scanner job management module 224 performs general control of scan processing. The scanner job management module 224 implements a scanner function using the service providing module group 230.

The network management module 225 is a module that manages a network controller (not illustrated) and controls the processing of received data obtained from the network controller. The network management module 225 receives data from the network controller by controlling communications protocols (such as FTP [file transfer protocol] and LPR [line printer remote protocol]) that are used to receive data from the host computer 4, and transfers the received data to other modules. In providing Web services, the network management module 225 receives data by HTTP (REST) access from clients, and transfers the received data to the Web service providing module 226.

The Web service providing module 226 is a module that operates as an HTTP server for REST and SOAP and provides Web services to clients. The Web service providing module 226 cooperates with other modules in the image forming apparatus 1 in order to provide various functions as Web services. For example, the Web service providing module 226 cooperates with the printer job management module 222 in order to provide a printer print function. Furthermore, the Web service providing module 226 cooperates with the copy job management module 223 and the scanner job management module 224 so as to provide a copy function and a scanner function as Web services. Although not illustrated in the drawings, the Web service providing module 226 may provide a facsimile function as a Web service by cooperating with a module that implements the facsimile function. The Web service providing module 226 receives requests from HTTP clients, transmits a response to HTTP clients, and serializes and deserializer JSON (JavaScript Object Notation) data included in messages transferred between a server and a client.

The print management module 227 is a module that performs control related to the printing of print images generated by the PDL analysis module 221. The print management module 227 executes various processes for causing the printer engine 212 (FIG. 1) to perform printing of print images stored in a memory or an external storage device managed by the memory management module 229. The print management module 227 issues a paper feeding or ejection command, issues a post-processing execution command, and detects a printing-related error situation and reports the detected error situation to other modules.

The system management module 228 is a module that manages and controls the apparatus configuration information and the apparatus condition of the image forming apparatus 1. The apparatus configuration information includes information on the attachment and detachment of paper feeding trays and paper ejection trays and information on paper arrangement in paper feeding trays. The apparatus condition refers to the operating state of the image forming apparatus 1 such as printing, waiting, or suspending due to the occurrence of an error such as a paper jam or the absence of paper. In addition to reporting such information to other modules, the system management module 228 manages user-provided apparatus settings (such as customizable items that are variably set to change operations).

The memory management module 229 is a module that manages a memory and an external storage device. The memory management module 229 allocates or frees memory or an external storage device based on other modules' requests.

The service providing module group 230 refers to a collection of modules that provide various kinds of services. The modules of the service providing module group 230 communicate with one another so as to share in performing the basic operations of the image forming apparatus 1 and cooperate to respond to requests from an upper layer.

A description is given below of operations of the above-described embodiment.

Figure 4:
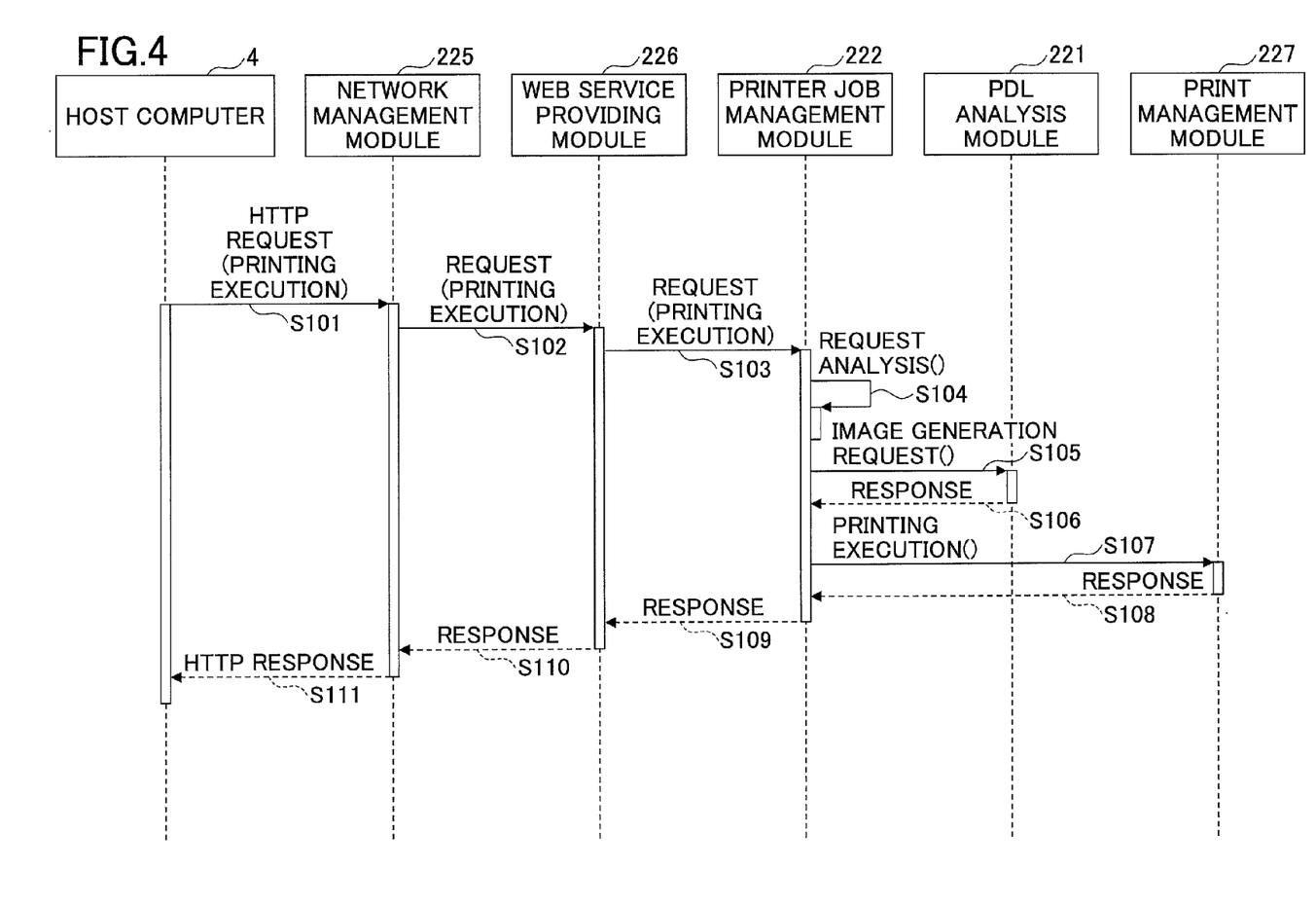
FIG. 4 is a sequence diagram illustrating printing by a Web API.

FIG. 4 is a sequence diagram illustrating printing by a Web API.

Referring to FIG. 4, at step S101, the host computer 4 operating as an HTTP client transmits an HTTP request for execution of printing to the image forming apparatus 1, and the network management module 225 of the body part 2 receives the HTTP request. For example, a uniform resource identifier (URI) such as "/printer/job/" is specified in the HTTP request for execution of printing to be transmitted.

In response to the reception of the HTTP request, at step S102, the network management module 225 transmits a request for execution of printing to the Web service providing module 226.

At step S103, the Web service providing module 226 notifies a module corresponding to the request to execute processing. In this example, the Web service providing module 226 transmits a request for execution of printing to the printer job management module 222. To be more specific, by registering a URI and an event handler corresponding to the URI at the time of, for example, activation, the Web service providing module 226 determines a transfer destination module and transmits a request to the determined module.

At step S104, the printer job management module 222 analyzes a header and a body included in the request for execution of printing, and at step S105, requests the PDL analysis module 221 to generate an image.

In response to reception of a response indicating the completion of image generation from the PDL analysis module 221 at step S106, at step S107, the printer job management module 222 instructs the print management module 227 to execute printing.

In response to reception of the completion of printing from the print management module 227 at step S108, at step S109, the printer job management module 222 notifies the Web service providing module 226 of the result as a response.

Likewise, at step S110, the Web service providing module 226 transmits a response to the network management module 225. Eventually, at step S111, an HTTP response is transmitted to the host computer 4 that is an HTTP client.

Here, a print execution process in the printer is illustrated by way of example. Other functions also are implemented by the Web service providing module 226 notifying corresponding modules to execute processing.

Figure 5:
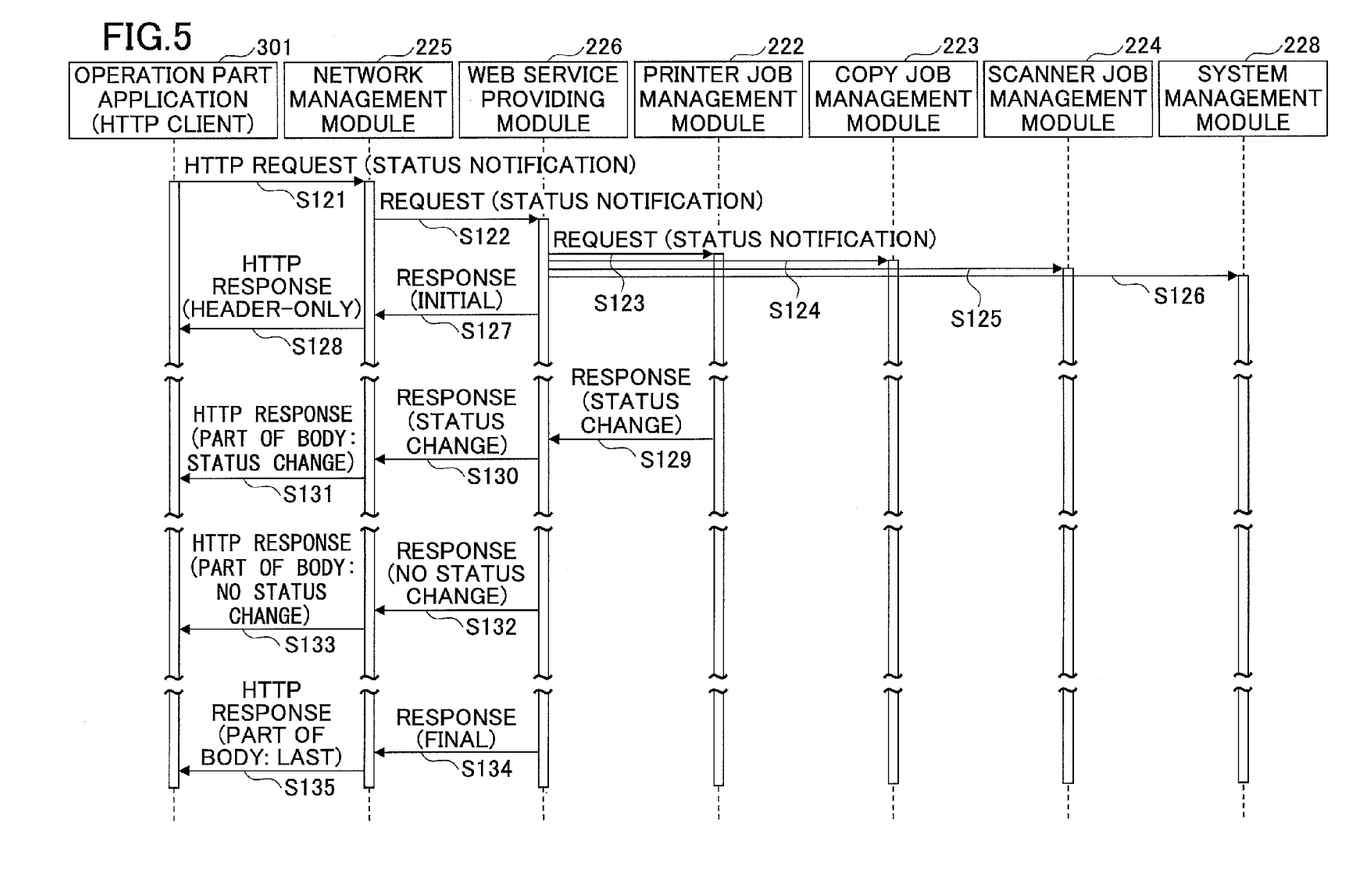
FIG. 5 is a sequence diagram illustrating a process of status notification by a Web API.

FIG. 5 is a sequence diagram illustrating a process of status notification by a Web API.

Referring to FIG. 5, at step S121, the operation part application 301 of the operation part 3, which operates as an HTTP client, transmits an HTTP request for status notification to the body part 2, and the network management module 225 receives the HTTP request. A session is established between the operation part application 301 and the network management module 225 by the HTTP request for status notification by the operation part application 301.

In response to the reception of the HTTP request, at step S122, the network management module 225 transmits a request for status notification to the Web service providing module 226.

The Web service providing module 226 transmits a request for status notification to modules that manage statuses to be reported. Here, at step S123, the Web service providing module 226 transmits a request for status notification to the printer job management module 222. Furthermore, at step S124, the Web service providing module 226 transmits a request for status notification to the copy job management module 223. Furthermore, at step S125, the Web service providing module 226 transmits a request for status notification to the scanner job management module 224. Furthermore, at step S126, the Web service providing module 226 transmits a request for status notification to the system management module 228.

Furthermore, at step S127, the Web service providing module 226 transmits an initial response that includes no status notification to the network management module 225.

In response, at step S128, the network management module 225 transmits a header-only HTTP response to the operation part application 301. This HTTP response is not complete as a normal HTTP response, so that the session remains maintained.

Thereafter, for example, when the printer job management module 222 detects a status change, at step S129, the printer job management module 222 transmits a response reporting the status change to the Web service providing module 226.

In response, at step S130, the Web service providing module 226 notifies the network management module 225 of the status change as part of the response.

In response, at step S131, the network management module 225 transmits an HTTP response including the data of the status change as part of the body to the operation part application 301.

Thereafter, when any of the printer job management module 222, the copy job management module 223, the scanner job management module 224, and the system management module 228 detects a status change, an HTTP response including the data of the status change as part of the body is transmitted to the operation part application 301 through the Web service providing module 226 and the network management module 225.

Furthermore, when there is no status change to report to the operation part application 301 for a predetermined time, at step S132, the Web service providing module 226 notifies the network management module 225 of the absence of a status change as part of the response when the predetermined time elapses, in order to prevent the session from being closed by the occurrence of a timeout on the operation part application 301 side.

In response, at step S133, the network management module 225 transmits an HTTP response including the data of the absence of a status change as part of the body to the operation part application 301.

Then, when status notification becomes unnecessary at the time of, for example, turning off the body part 2, at step S134, the Web service providing module 226 transmits a final response that completes the session to the network management module 225.

At step S135, the network management module 225 transmits an HTTP response of the last part of the body to the operation part application 301. As a result, an HTTP response corresponding to the initial HTTP request (step S121) is completed, so that the session is closed.

Thus, the session is maintained after the HTTP request for status notification from the operation part application 301 until status notification becomes unnecessary, and during this period, in response to detection of status changes, the status changes are reported by divisional responses (into which a response is divided). Therefore, it is possible to report every status change in real time.

A more detailed description is given below of the above-described divisional responses.

Web services are based on the idea that a server and a client exchange information by HTTP communications.

Figure 6:
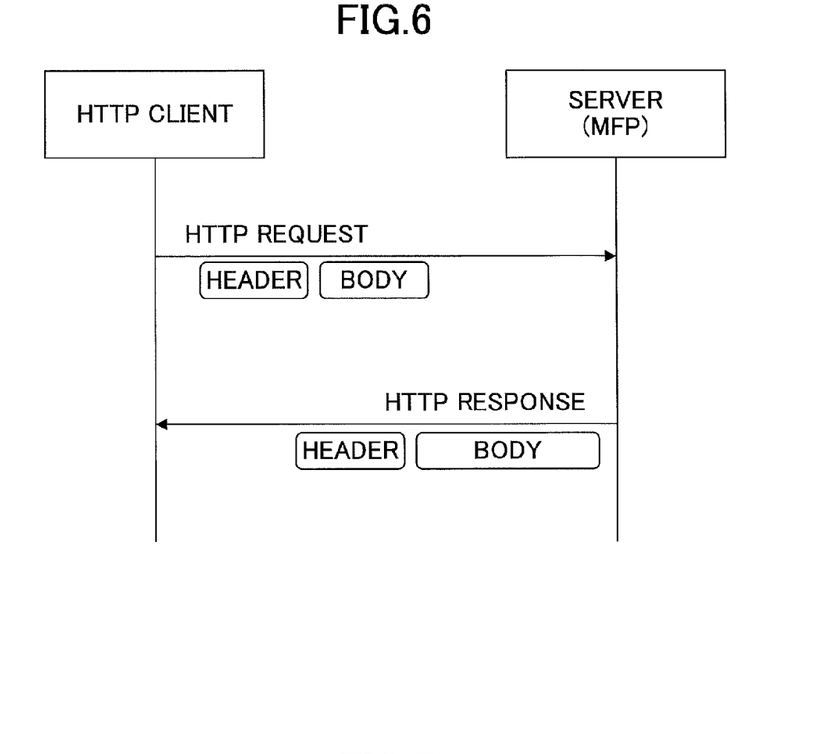
FIG. 6 is a diagram illustrating HTTP communications.
Figure 7:
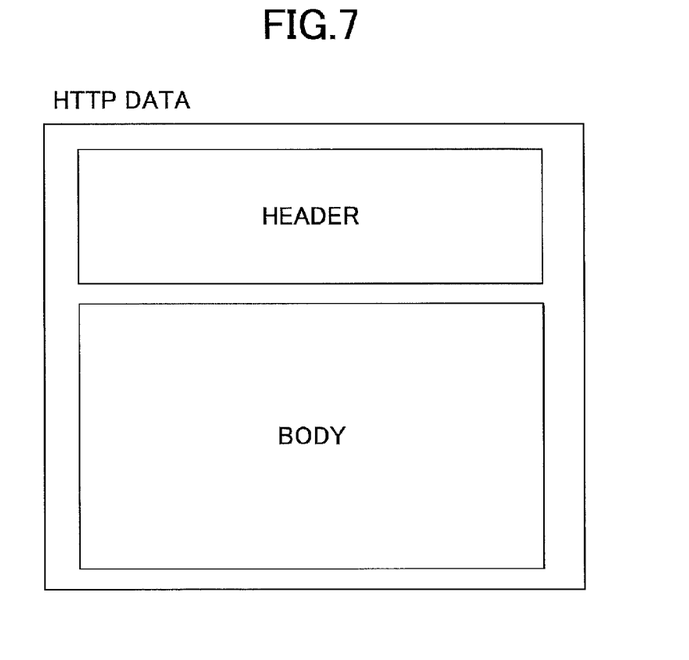
FIG. 7 is a diagram illustrating a structure of HTTP data.

FIG. 6 is a diagram illustrating HTTP communications. FIG. 6 schematically illustrates HTTP communications between an HTTP client and a server. According to HTTP communications, an HTTP client transmits an HTTP request formed of a header and a body to a server, and the server transmits an HTTP response also formed of a header and a body to the HTTP client. Thereby, information is exchanged between the HTTP client and the server. FIG. 7 is a diagram illustrating a structure of HTTP data, which include a header and a body.

According to the protocol of HTTP communications, the basic principle is that an HTTP client always issues an HTTP request and a server responds to the HTTP request. Typically, when the server transmits an HTTP response in response to the HTTP request from the HTTP client, the processing of the request is completed, and thereafter, the server is prevented from transmitting information to the HTTP client before the HTTP client issues another HTTP request.

Figure 8:
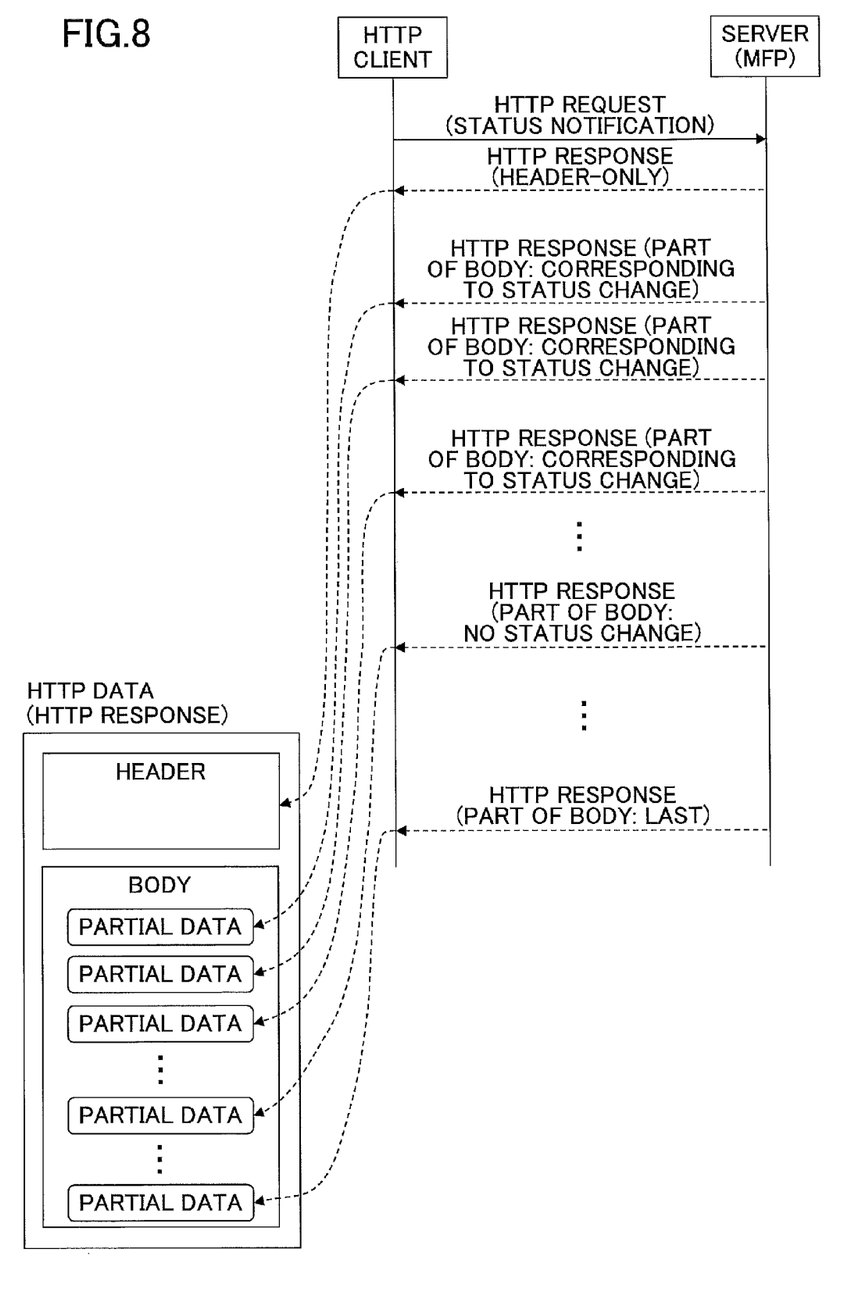
FIG. 8 is a diagram illustrating the relationship between a divided response and HTTP data.

Therefore, the HTTP response is divided and transmitted in order to prevent the processing of the request from being completed by the HTTP response from the server. FIG. 8 is a diagram illustrating the relationship between the divided response and HTTP data.

An HTTP client that desires to detect a status change of a server transmits an HTTP request for status notification to the server. The server first returns only a header portion in response to the establishment of a connection with the HTTP client. Normally, a Content-Length indicating a data size is commonly described in the header. In this case, however, the size of data to be returned is not known beforehand. Accordingly, the header is returned with no description of a Content-Length. Including no Content-Length in the header is not a problem in terms of HTTP specifications.

Thereafter, a body portion is not transmitted before there is a status change of the server. The HTTP client waits for a response from the server.

When any state change such as the occurrence of an error occurs in the server, the server transmits part of the body indicating the state change to the HTTP client. Even when the transmission of the part of the body is completed, the server does not transmit a notification of the completion of the transmission. Therefore, both the HTTP client and the server maintain the state of being in the process of transmitting or receiving a body portion.

It is possible to implement status notification that is independent of the timing of the HTTP client by repeating the above-noted process every time a state change of the server occurs.

In the end, HTTP protocol-compliant data formed of a header and a body result. This makes it possible to implement the status notification with software capable of performing common HTTP communications and in an environment where it is possible perform common HTTP communications.

When no response is returned from the server for a certain time, the HTTP client may cut off communications. When no state change occurs in the server for a certain time, the communications may be maintained by transmitting part of the body indicating the absence of a status change from the server.

Figure 9A:
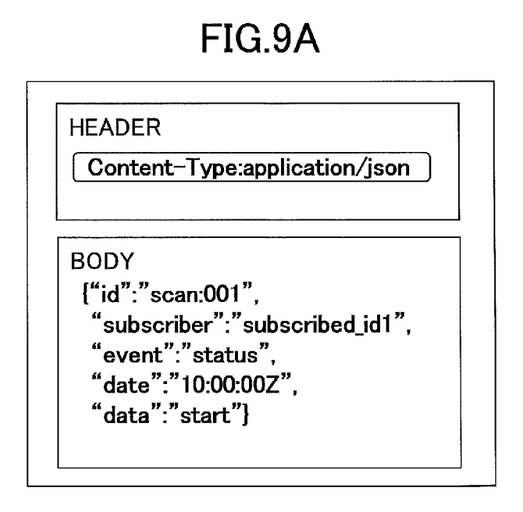
FIGS. 9A and 9B are diagrams illustrating data formats.
Figure 9B:
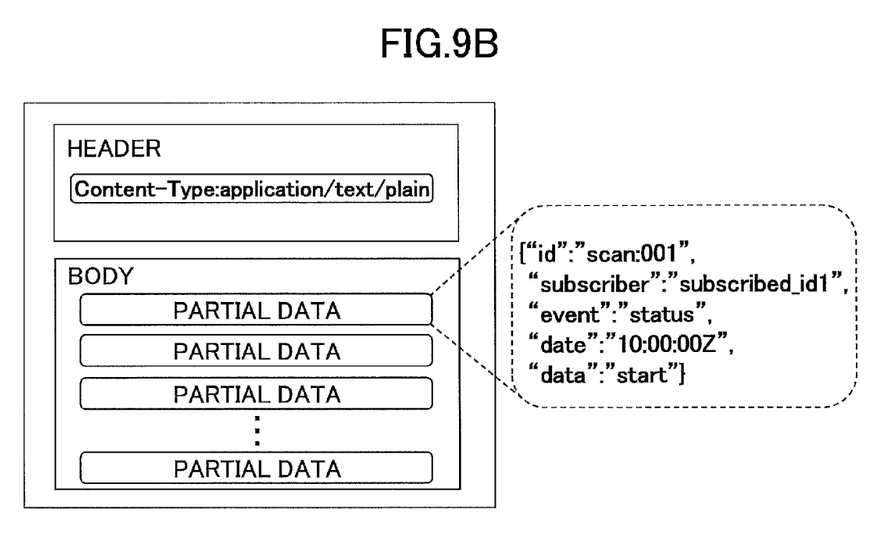

FIGS. 9A and 9B are diagrams illustrating data formats.

According to HTTP, it is possible to transmit various kinds of data such as text data, image data, XML data, and JSON data. Recently, data are more often transmitted and received in JSON format as use of Web services.

FIG. 9A illustrates a case where JSON format is used in a normal HTTP response. Referring to FIG. 9A, "json" is specified in the Content-Type header field. The whole body is written in JSON format.

FIG. 9B illustrates a case where JSON format is used in a divided response. Referring to FIG. 9B, individual partial data of the body are written in JSON format, and delimiters (for example, two line feeds each) are added. In this case, all the body is not in JSON format. Therefore, the Content-Type of the header is "text/plain".

For the HTTP client, there is a meaning in receiving individual partial data. Therefore, it is easier for the HTTP client to perform processing when individual partial data are in a predetermined data format such as JSON format.

The HTTP client sequentially reads received data in accordance with the HTTP protocol. At this point, a delimiter attached to the end of each data portion makes it possible to separately read individual partial data.

Figure 10:
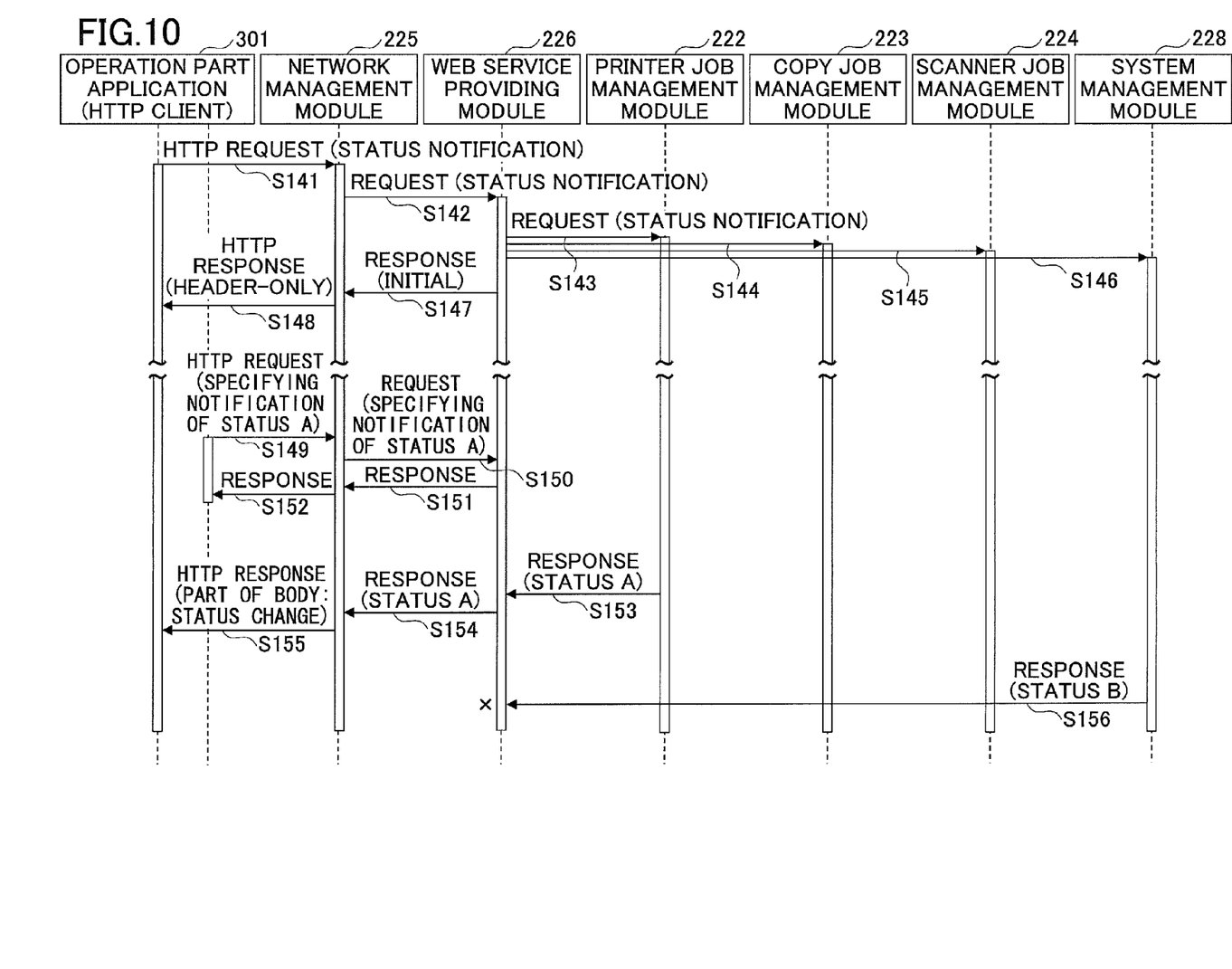
FIG. 10 is a sequence diagram illustrating another process of status notification by a Web API.

FIG. 10 is a sequence diagram illustrating another process of status notification by a Web API, in which a status change to be reported is specified by an HTTP client.

Referring to FIG. 10, at step S141, the operation part application 301 of the operation part 3, which operates as an HTTP client, transmits an HTTP request for status notification to the body part 2, and the network management module 225 receives the HTTP request. A session is established between the operation part application 301 and the network management module 225 by the HTTP request for status notification by the operation part application 301.

In response to the reception of the HTTP request, at step S142, the network management module 225 transmits a request for status notification to the Web service providing module 226.

The Web service providing module 226 transmits a request for status notification to modules that manage statuses to be reported. Here, at step S143, the Web service providing module 226 transmits a request for status notification to the printer job management module 222. Furthermore, at step S144, the Web service providing module 226 transmits a request for status notification to the copy job management module 223. Furthermore, at step S145, the Web service providing module 226 transmits a request for status notification to the scanner job management module 224. Furthermore, at step S146, the Web service providing module 226 transmits a request for status notification to the system management module 228.

Furthermore, at step S147, the Web service providing module 226 transmits an initial response that includes no status notification to the network management module 225.

In response, at step S148, the network management module 225 transmits a header-only HTTP response to the operation part application 301. This HTTP response is not complete as a normal HTTP response, so that the session remains maintained.

Thereafter, at step S149, the operation part application 301 transmits an HTTP request that specifies notification of Status A to the body part 2, and the network management module 225 receives the HTTP request.

In response to the reception of the HTTP request, at step S150, the network management module 225 transmits a request for status notification that specifies Status A to the Web service providing module 226.

The Web service providing module 226 internally retains the specification of Status A, and at step S151, returns a response to the network management module 225. At step S152, the network management module 225 returns a response to the operation part application 301. The session of this request is completed by this.

Thereafter, for example, when the printer job management module 222 detects a status change of Status A, at step S153, the printer job management module 222 transmits a response reporting the status change of Status A to the Web service providing module 226.

In response, at step S154, the Web service providing module 226 notifies the network management module 225 of the status change of Status A as part of the response because the status change reported from the printer job management module 222 matches the internally retained specification of Status A to be reported.

In response, at step S155, the network management module 225 transmits an HTTP response including the data of the status change of Status A as part of the body to the operation part application 301.

Thereafter, when the system management module 228 detects a status change of Status B, at step S156, the system management module 228 transmits a response reporting the status change of Status B to the Web service providing module 226.

In response, the Web service providing module 226 transmits no response because the status change reported from the system management module 228 does not match the internally retained specification of Status A to be reported.

Thereafter, if the operation part application 301 transmits a request that specifies notification of Status B, then, notification is also performed with respect to a status change of Status B.

Like in the process illustrated in FIG. 5, when there is no status change to report to the operation part application 301 for a predetermined time, the Web service providing module 226 notifies the network management module 225 of the absence of a status change as part of the response.

Furthermore, the network management module 225 transmits an HTTP response of the last part of the body to the operation part application 301 at the time of, for example, turning off the body part 2 the same as in the process of FIG. 5.

In the above-described case, the Web service providing module 226 retains information on a status to be reported, and determines whether to report a status change when being notified of the status change. Alternatively, a status to be reported may be reported to a corresponding module, and the module may determine whether to report a status change.

Figure 11:
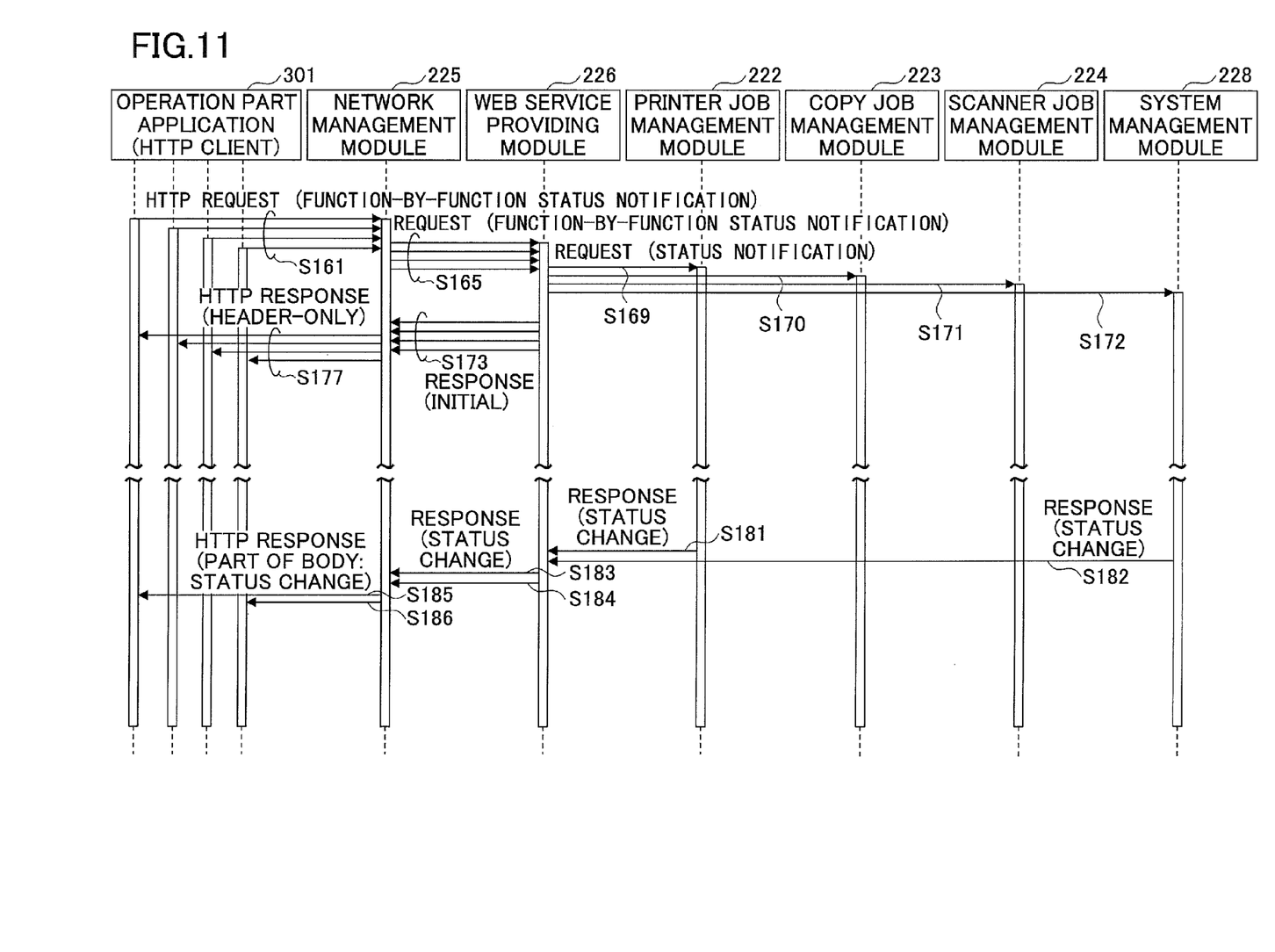
FIG. 11 is a sequence diagram illustrating yet another process of status notification by a Web API.

FIG. 11 is a sequence diagram illustrating yet another process of status notification by a Web API, in which divisional responses are made function by function so as to prevent a delay in reporting a status change even when multiple status changes occur substantially at the same time with respect to different functions. That is, according to the technique illustrated in FIG. 5, for example, if the system management module 228 transmits a response reporting a status change substantially at the same time that the printer job management module 222 transmits a response reporting a status change, an HTTP response from the system management module 228 is not transmitted to the operation part application 301 before the completion of transmission of an HTTP response from the printer job management module 222 to the operation part application 301. This is not the case with the process illustrated in FIG. 11.

Referring to FIG. 11, at step S161, the operation part application 301 of the operation part 3, which operates as an HTTP client, transmits an HTTP request for status notification to the body part 2 with respect to each function, and the network management module 225 receives the HTTP requests. A session is established between the operation part application 301 and the network management module 225 by the HTTP request for status notification by the operation part application 301 with respect to each function.

In response to the reception of the HTTP requests, at step S165, the network management module 225 transmits a request for status notification to the Web service providing module 226 with respect to each function.

The Web service providing module 226 transmits a request for status notification to modules that manage statuses to be reported. Here, at step S169, the Web service providing module 226 transmits a request for status notification to the printer job management module 222. Furthermore, at step S170, the Web service providing module 226 transmits a request for status notification to the copy job management module 223. Furthermore, at step S171, the Web service providing module 226 transmits a request for status notification to the scanner job management module 224. Furthermore, at step S172, the Web service providing module 226 transmits a request for status notification to the system management module 228.

Furthermore, at step S173, the Web service providing module 226 transmits an initial response that includes no status notification to the network management module 225 with respect to each function.

In response, at step S177, the network management module 225 transmits a header-only HTTP response to the operation part application 301 with respect to each function. This HTTP response is not complete as a normal HTTP response, so that the session remains maintained with respect to each function.

Thereafter, when the printer job management module 222 detects a status change, at step S181, the printer job management module 222 transmits a response reporting the status change to the Web service providing module 226.

When the system management module 228 detects a status change substantially at the same time with the detection of the status change by the printer job management module 222, at step S182, the system management module 228 transmits a response reporting the status change to the Web service providing module 226.

In response, the Web service providing module 226 notifies the network management module 225 of the status change detected by the printer job management module 222 as part of the response at step S183 and of the status change detected by the system management module 228 as part of the response at step S184.

In response, the network management module 225 transmits an HTTP response including the data of the status change detected by the printer job management module 222 as part of the body to the operation part application 301 at step S185, and transmits an HTTP response including the data of the status change detected by the system management module 228 as part of the body to the operation part application 301 at step S186.

Thereafter, when any of the printer job management module 222, the copy job management module 223, the scanner job management module 224, and the system management module 228 detects a status change, an HTTP response including the data of the status change as part of the body is transmitted to the operation part application 301 through the Web service providing module 226 and the network management module 225.

Furthermore, when there is no status change to report to the operation part application 301 for a predetermined time, the Web service providing module 226 notifies the network management module 225 of the absence of a status change as part of the response with respect to each request for status notification, and the network management module 225 transmits an HTTP response to the operation part application 301 with respect to each request for status notification.

Furthermore, when status notification becomes unnecessary, the Web service providing module 226 transmits a final response that completes the session to the network management module 225 with respect to each request for status notification, and the network management module 225 transmits an HTTP response of the last part of the body to the operation part application 301 with respect to each request for status notification, so that the session is closed with respect to each function.

As described above, according to the above-described embodiment, it is possible to ensure that changes in the status of an information processing apparatus operating as a server are reported in real time to an information processing apparatus operating as a client.

According to an aspect of the present invention, an information processing apparatus of an information processing system using a protocol according to which a session with respect to a single request is completed by returning a predetermined response to the single request, wherein another information processing apparatus transmits a request for status notification to the information processing apparatus, and the information processing apparatus transmits a response of the status notification to the other information processing apparatus, includes a processor; and a memory storing instructions that, when executed by the processor, causes the information processing apparatus to: transmit a header of the response of the status notification to the other information processing apparatus in response to receiving the request for the status notification from the other information processing apparatus; transmit a part of a body of the response of the status notification to the other information processing apparatus in response to occurrence of a status change to be reported in the information apparatus, the part of the body including information on the status change; and transmit a last part of the body of the response of the status notification to the other information processing apparatus in response to the status notification becoming unnecessary.

According to an aspect of the present invention, an information processing method executed by an information processing apparatus of an information processing system using a protocol according to which a session with respect to a single request is completed by returning a predetermined response to the single request, wherein another information processing apparatus transmits a request for status notification to the information processing apparatus, and the information processing apparatus transmits a response of the status notification to the other information processing apparatus, includes transmitting a header of the response of the status notification to the other information processing apparatus in response to receiving the request for the status notification from the other information processing apparatus; transmitting a part of a body of the response of the status notification to the other information processing apparatus in response to occurrence of a status change to be reported in the information apparatus, the part of the body including information on the status change; and transmitting a last part of the body of the response of the status notification to the other information processing apparatus in response to the status notification becoming unnecessary.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority or inferiority of the invention. An information processing system, apparatus, and method have been described based on one or more embodiments of the present invention. It should be understood, however, that the various changes, substitutions, and alterations could be made hereto without departing from the spirit and scope of the invention.

What is claimed is:
1. An information processing system, comprising:
a first information processing apparatus; and
a second information processing apparatus,
wherein the first information processing apparatus transmits a request for status notification to the second information processing apparatus, and the second information processing apparatus transmits a single response of the status notification to the first information processing apparatus in response to reception of the request, the single response including a header and a body, and
wherein the second information processing apparatus includes
a processor; and
a memory storing instructions that, when executed by the processor, cause the second information processing apparatus to:

transmit only the header of the single response of the status notification to the first information processing apparatus in response to receiving the request for the status notification from the first information processing apparatus;

transmit only a part of the body of the single response of the status notification to the first information processing apparatus in response to occurrence of a status change to be reported in the second information processing apparatus, the part of the body including information on the status change; and transmit only a last part of the body of the single response of the status notification to the first information processing apparatus in response to the status notification becoming unnecessary.

2. The information processing system as claimed in claim 1, wherein the second information processing apparatus is further caused to transmit only another part of the body of the single response of the status notification to the first information processing apparatus in response to no occurrence of the status change to be reported for a predetermined time, said another part of the body including information on an absence of the status change.

3. The information processing system as claimed in claim 1, wherein the first information processing apparatus transmits a request that specifies the status change to be reported, to the second information processing apparatus, and wherein the second information processing apparatus is further caused to report the specified status change to the first information processing apparatus.

4. The information processing system as claimed in claim 1, wherein the first information processing apparatus transmits the request for the status notification with respect to each of functions of the second information processing apparatus.

5. The information processing system as claimed in claim 1, wherein the header of the response of the status notification includes no description of a data size.

6. The information processing system as claimed in claim 1, wherein the part of the body of the response of the status notification is written in JSON format with an addition of a delimiter.

7. The information processing system as claimed in claim 1, wherein the second information processing apparatus is a body part that performs predetermined information processing, and the first information processing apparatus is an operation part that receives an operation to the body part.

8. An information processing apparatus of an information processing system, wherein another information processing apparatus transmits a single response of status notification to the information processing apparatus in response to reception of a request for the status notification from the information processing apparatus, the information processing apparatus comprising:

a processor; and a memory storing instructions that, when executed by the processor, cause the information processing apparatus to:

transmit the request for the status notification to said another information processing apparatus of the information processing system;

receive only a header of the single response of the status notification transmitted from said another information processing apparatus in response to the request for the status notification;

receive only a part of a body of the single response of the status notification transmitted from said another information processing apparatus in response to occurrence of a status change to be reported in said another information processing apparatus, the part of the body including information on the status change; and receive only a last part of the body of the single response of the status notification transmitted from said another information processing apparatus in response to the status notification becoming unnecessary.

9. An information processing method executed by an information processing apparatus of an information processing system, wherein another information processing apparatus transmits a single response of status notification to the information processing apparatus in response to reception of a request for the status notification from the information processing apparatus, the information processing method comprising:

transmitting the request for the status notification to said another information processing apparatus of the information processing system;

receiving only a header of the single response of the status notification transmitted from said another information processing apparatus in response to the request for the status notification;

receiving only a part of a body of the single response of the status notification transmitted from said another information processing apparatus in response to occurrence of a status change to be reported in said another information processing apparatus, the part of the body including information on the status change; and receiving only a last part of the body of the single response of the status notification transmitted from said another information processing apparatus in response to the status notification becoming unnecessary.

10. An information processing system using a protocol according to which a session with respect to a single request is completed by returning a predetermined response to the single request, the information processing system comprising:

a first information processing apparatus; and a second information processing apparatus, wherein the first information processing apparatus transmits a request for status notification to the second information processing apparatus, and the second information processing apparatus transmits a response of the status notification to the first information processing apparatus, and wherein the second information processing apparatus includes a processor; and a memory storing instructions that, when executed by the processor, cause the second information processing apparatus to:

transmit only a header of the response of the status notification to the first information processing apparatus in response to receiving the request for the status notification from the first information processing apparatus;

transmit only a part of a body of the response of the status notification to the first information processing apparatus in response to occurrence of a status change to be reported in the second information apparatus, the part of the body including information on the status change; and transmit only a last part of the body of the response of the status notification to the first information processing apparatus in response to the status notification becoming unnecessary.

11. The information processing system as claimed in claim 10, wherein a communication between the first and second information processing apparatuses is established by the request for the status notification transmitted by the first information processing apparatus and is closed by the last part of the body of the response of the status notification transmitted by the second information processing apparatus, and the header and the part of the response are transmitted during the communication.

* * * * *